US012120574B2

United States Patent
Ly et al.

(10) Patent No.: US 12,120,574 B2
(45) Date of Patent: Oct. 15, 2024

(54) RELAY SWITCHING FOR A REMOTE USER EQUIPMENT

(71) Applicant: QUALCOMM Incorporated, San Diego, CA (US)

(72) Inventors: Hung Dinh Ly, San Diego, CA (US); Tingfang Ji, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 17/443,305

(22) Filed: Jul. 23, 2021

(65) Prior Publication Data

US 2022/0078693 A1    Mar. 10, 2022

Related U.S. Application Data

(60) Provisional application No. 62/706,773, filed on Sep. 9, 2020.

(51) Int. Cl.
*H04W 36/38* (2009.01)
*H04B 7/155* (2006.01)
(Continued)

(52) U.S. Cl.
CPC ............ *H04W 36/38* (2013.01); *H04B 7/155* (2013.01); *H04W 36/302* (2023.05); *H04W 36/037* (2023.05)

(58) Field of Classification Search
CPC . H04W 36/38; H04W 36/0011; H04W 36/30; H04W 36/305; H04W 88/04; H04W 36/03; H04B 7/155; H04B 7/15528
(Continued)

(56) References Cited

U.S. PATENT DOCUMENTS 10,439,682 B2 * 10/2019 Tseng ................ H04W 36/0022
10,492,120 B2 * 11/2019 Yasukawa ............. H04W 72/02
(Continued)

FOREIGN PATENT DOCUMENTS

CN      101541029 A  *  9/2009  ........... H04W 24/10
CN      101626607 A  *  1/2010
(Continued)

OTHER PUBLICATIONS

Huawei, et al., "On RLM and RLF in NR V2X", 3GPP Draft, R1-1907494, 3GPP TSG RAN WG1 Meeting #97, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728927, 3 Pages, Retrieved from the Internet: URL:http://www.3gpp.org/ftp/Meetings%5F3GPP%5FSYNC/RAN1/Docs/R1%2D1907494%2Ezip [retrieved on May 13, 2019] the whole document.
(Continued)

*Primary Examiner* — Jae Y Lee
*Assistant Examiner* — Oladiran Gideon Olaleye
(74) *Attorney, Agent, or Firm* — Harrity & Harrity, LLP

(57) ABSTRACT

Various aspects of the present disclosure generally relate to wireless communication. In some aspects, a remote user equipment (UE) may receive a measurement reference channel configuration from a source relay. The UE may transmit a reference channel based at least in part on the measurement reference channel configuration. The UE may receive, from the source relay, a command for the remote UE to switch from the source relay to a target relay based at least in part on a measurement of the reference channel transmitted from the remote UE. Numerous other aspects are provided.

30 Claims, 11 Drawing Sheets

(51) Int. Cl.
H04W 36/00 (2009.01)
H04W 36/30 (2009.01)

(58) Field of Classification Search
USPC .......................................................... 370/315
See application file for complete search history.

(56) References Cited

U.S. PATENT DOCUMENTS

| | | | | |
|---|---|---|---|---|
| 10,548,123 B2 * | 1/2020 | Ouchi | ................... | H04W 72/30 |
| 2009/0285149 A1 * | 11/2009 | Kwon | ................... | H04W 40/02 |
| | | | | 370/329 |
| 2013/0265896 A1 * | 10/2013 | Mallik | ................. | H04W 24/02 |
| | | | | 370/252 |
| 2018/0206176 A1 * | 7/2018 | Panteleev | ............. | H04W 72/20 |
| 2019/0289520 A1 * | 9/2019 | Xu | ................... | H04W 36/0055 |
| 2020/0112400 A1 * | 4/2020 | Lee | ....................... | H04L 5/0055 |
| 2021/0037544 A1 * | 2/2021 | Andrews | ............. | H04W 72/121 |
| 2022/0200874 A1 * | 6/2022 | Fendt | ..................... | H04L 41/40 |

FOREIGN PATENT DOCUMENTS

| | | | | | |
|---|---|---|---|---|---|
| CN | 104508988 | A | * | 4/2015 | ............. H04B 17/24 |
| CN | 108810854 | A | * | 11/2018 | ............... H04L 5/00 |
| CN | 109391973 | A | * | 2/2019 | ............. H04W 24/02 |
| EP | 3373652 | A1 | | 9/2018 | |
| EP | 3481106 | A1 | | 5/2019 | |
| KR | 20190140896 | A | * | 12/2019 | ........ H04W 36/0009 |
| WO | WO-2017169301 | A1 | * | 10/2017 | ......... H04L 25/0226 |
| WO | WO-2018196513 | A1 | * | 11/2018 | ............... H04L 5/00 |
| WO | WO-2019029422 | A1 | * | 2/2019 | ............... H04L 5/00 |
| WO | WO-2020033089 | A1 | * | 2/2020 | ............. H04L 1/1819 |

OTHER PUBLICATIONS

International Search Report and Written Opinion—PCT/US2021/071341—ISA/EPO—Jan. 21, 2022.
ZTE: "TP for Relay to Relay Path Switch in feD2D", 3GPP Draft, 3GPP TSG-RAN WG3 Meeting #96, R3-171655_TP for Relay to Relay Path Switch, 3RD Generation Partnership Project (3GPP), Mobile Competence Centre, 650, Route Des Lucioles, F-06921 Sophia-Antipolis Cedex, France, vol. RAN WG3. No. Hangzhou, China, May 15, 2017-May 19, 2017, May 14, 2017 (May 14, 2017). XP051276441, 10 Pages, Retrieved from the Internet: URL:http://www.3gpp.org/ftp/Meetings_3GPP_SYNC/RAN3/Docs/ [retrieved on May 14, 2017] pp. 8,9, p. 7-p. 8, figure 4.

* cited by examiner

RELAY SWITCHING FOR A REMOTE USER EQUIPMENT

CROSS-REFERENCE TO RELATED APPLICATION

This Patent application claims priority to U.S. Provisional Patent Application No. 62/706,773, filed on Sep. 9, 2020, entitled "RELAY SWITCHING FOR A REMOTE USER EQUIPMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for relay switching for a remote user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a remote user equipment (UE) includes receiving a measurement reference channel configuration from a source relay; transmitting a reference channel based at least in part on the measurement reference channel configuration; establishing a connection with a plurality of candidate relays; and receiving, from the source relay, a command for the remote UE to switch from the source relay to a target relay included in the plurality of candidate relays based at least in part on a measurement of the reference channel transmitted from the remote UE.

In some aspects, a method of wireless communication performed by a source relay includes receiving a reference channel from a remote UE; performing a measurement of the reference channel received from the remote UE; and transmitting, to the remote UE, a command for the remote UE to switch from the source relay to a target relay based at least in part on the measurement of the reference channel.

In some aspects, a method of wireless communication performed by a base station includes transmitting, to a remote UE via a source relay, a measurement reference channel configuration; and selecting a target relay for the remote UE based at least in part on a measurement of a reference channel, wherein the reference channel is transmitted based at least in part on the measurement reference channel configuration.

In some aspects, a remote UE for wireless communication includes a memory and one or more processors coupled to the memory, the one or more processors configured to: receive a measurement reference channel configuration from a source relay; transmit a reference channel based at least in part on the measurement reference channel configuration; establish a connection with a plurality of candidate relays; and receive, from the source relay, a command for the remote UE to switch from the source relay to a target relay included in the plurality of candidate relays based at least in part on a measurement of the reference channel transmitted from the remote UE.

In some aspects, a source relay for wireless communication includes a memory and one or more processors coupled to the memory, the one or more processors configured to: receive a reference channel from a remote UE: perform a measurement of the reference channel received from the remote UE; and transmit, to the remote UE, a command for the remote UE to switch from the source relay to a target relay based at least in part on the measurement of the reference channel.

In some aspects, a base station for wireless communication includes a memory and one or more processors coupled to the memory, the one or more processors configured to: transmit, to a remote UE via a source relay, a measurement reference channel configuration; and select a target relay for the remote UE based at least in part on a measurement of a reference channel, wherein the reference channel is transmitted based at least in part on the measurement reference channel configuration.

In some aspects, a non-transitory computer-readable medium storing a set of instructions for wireless communication includes one or more instructions that, when executed by one or more processors of a remote UE, cause the remote UE to: receive a measurement reference channel configuration from a source relay; transmit a reference channel based at least in part on the measurement reference channel configuration; establish a connection with a plurality of candidate relays; and receive, from the source relay, a command for the remote UE to switch from the source relay to a target relay included in the plurality of candidate relays based at least in part on a measurement of the reference channel transmitted from the remote UE.

In some aspects, a non-transitory computer-readable medium storing a set of instructions for wireless communication includes one or more instructions that, when executed by one or more processors of a source relay, cause the source relay to: receive a reference channel from a remote UE; perform a measurement of the reference channel received from the remote UE; and transmit, to the remote UE, a command for the remote UE to switch from the source relay to a target relay based at least in part on the measurement of the reference channel.

In some aspects, a non-transitory computer-readable medium storing a set of instructions for wireless communication includes one or more instructions that, when executed by one or more processors of a base station, cause the base station to: transmit, to a remote UE via a source relay, a measurement reference channel configuration; and select a target relay for the remote UE based at least in part on a measurement of a reference channel, wherein the reference channel is transmitted based at least in part on the measurement reference channel configuration.

In some aspects, a remote apparatus for wireless communication includes means for receiving a measurement reference channel configuration from a source relay apparatus; means for transmitting a reference channel based at least in part on the measurement reference channel configuration; means for establishing a connection with a plurality of candidate relays; and means for receiving, from the source relay apparatus, a command for the remote apparatus to switch from the source relay apparatus to a target relay apparatus included in the plurality of candidate relays based at least in part on a measurement of the reference channel transmitted from the remote apparatus.

In some aspects, a source relay apparatus for wireless communication includes means for receiving a reference channel from a remote apparatus; means for performing a measurement of the reference channel received from the remote apparatus; and means for transmitting, to the remote apparatus, a command for the remote apparatus to switch from the source relay apparatus to a target relay apparatus based at least in part on the measurement of the reference channel.

In some aspects, an apparatus for wireless communication includes means for transmitting, to a remote apparatus via a source relay apparatus, a measurement reference channel configuration; and means for selecting a target relay apparatus for the remote apparatus based at least in part on a measurement of a reference channel, wherein the reference channel is transmitted based at least in part on the measurement reference channel configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
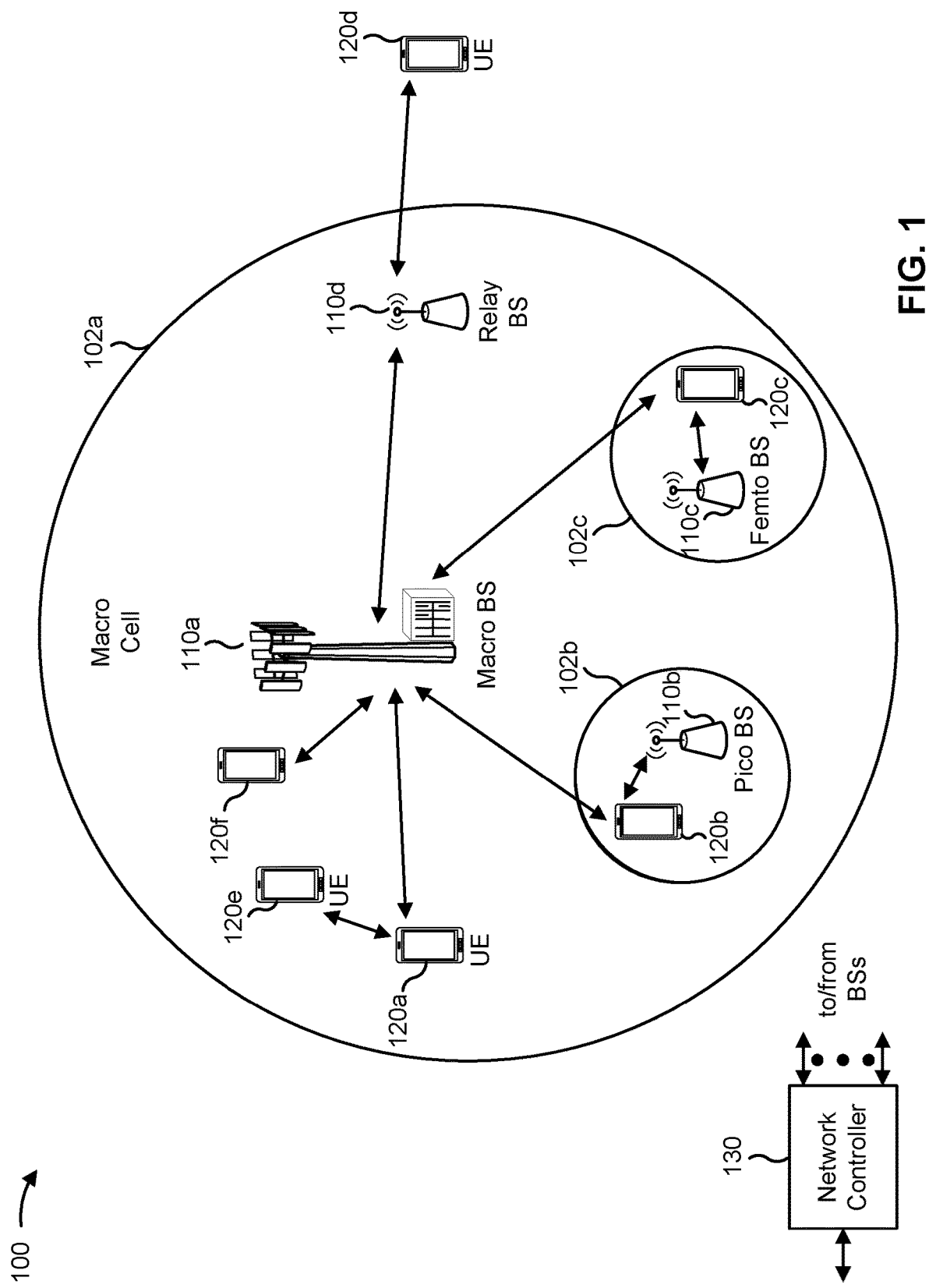
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz. FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ). FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
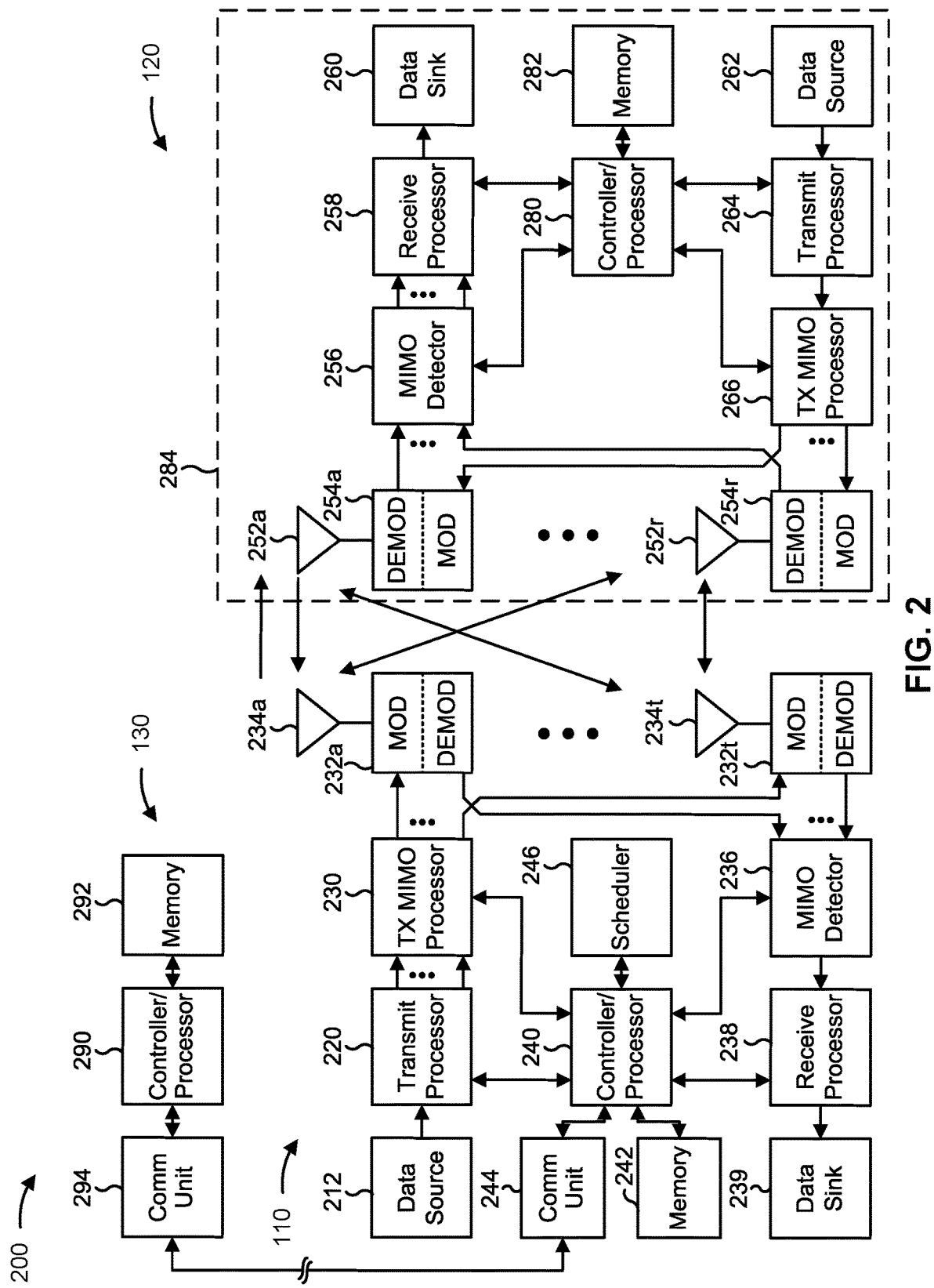
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with relay switching for a remote user equipment, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a remote UE (e.g., UE 120e) may include means for receiving a measurement reference channel configuration from a source relay, means for transmitting a reference channel based at least in part on the measurement reference channel configuration, and/or means for receiving, from the source relay, a command for the remote UE to switch from the source relay to a target relay based at least in part on a measurement of the reference channel transmitted from the remote UE. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a source relay (e.g., UE 120*a*) may include means for receiving a reference channel from a remote UE, means for performing a measurement of the reference channel received from the remote UE, and/or means for transmitting, to the remote UE, a command for the remote UE to switch from the source relay to a target relay based at least in part on the measurement of the reference channel. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a base station (e.g., base station 110) may include means for transmitting, to a remote UE via a source relay, a measurement reference channel configuration, and/or means for selecting a target relay for the remote UE based at least in part on a measurement of a reference channel, wherein the reference channel is transmitted based at least in part on the measurement reference channel configuration. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Figure 3:
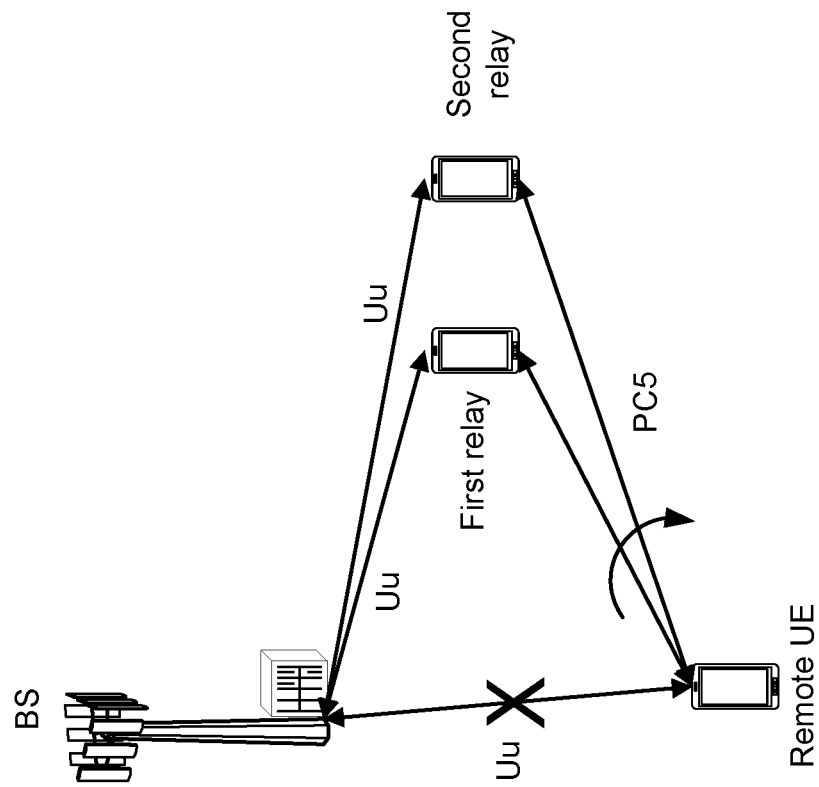
FIG. 3 is a diagram illustrating an example of intra-cell relay switching, in accordance with the present disclosure.

FIG. 3 is a diagram illustrating an example 300 of intra-cell relay switching, in accordance with the present disclosure.

A base station (e.g., base station 110) may be connected to a plurality of relays. The plurality of relays may include a first relay and a second relay. The first relay may be a first relay UE (e.g., UE 120*a*) and the second relay may be a second relay UE (e.g., 120*f*). The first relay may be a first non-UE device, such as a first fixed relay, and the second relay may be a second non-UE device, such as a second fixed relay. The first relay may be connected to the base station via a first Uu link, and the second relay may be connected to the base station via a second Uu link. The first relay and the second relay may be in a radio resource control (RRC) connected state.

The first and second relays with the first and second Uu links, respectively, to the base station may be within a defined range of a remote UE. The remote UE may be connected to the first relay via a PC5 link between the remote UE and the first relay. The PC5 link may be an active PC5 link between the remote UE and the first relay. The remote UE may be out of coverage with respect to the base station. In other words, the remote UE may not have a Uu link to the base station, but rather may communicate with the base station via the first relay. A link from the relay to the remote UE may be a forward link, and a link from the remote UE to the relay may be a reverse link. The remote UE may be in an RRC connected state.

The remote UE may select the first relay and establish the PC5 link with the first relay. However, after some time, the remote UE may switch to another relay, such as the second relay. For example, the remote UE may switch to the second relay when the first relay experiences a radio link failure. As another example, the first relay may experience the radio link failure on the first Uu link between the first relay and the base station. In yet another example of many where the remote UE would switch to the second relay, the remote UE may switch to the second relay when the PC5 link between the remote UE and the first relay degrades, which may occur when the first relay moves outside of a defined range of the remote UE.

When switching from the first relay to the second relay, the remote UE may establish a new PC5 link with the second relay and release the PC5 link with the first relay. In this case, the first relay may be considered a source relay, and the second relay may be considered a target relay.

As indicated above, FIG. 3 is provided as an example. Other examples may differ from what is described with regard to FIG. 3.

Figure 4:
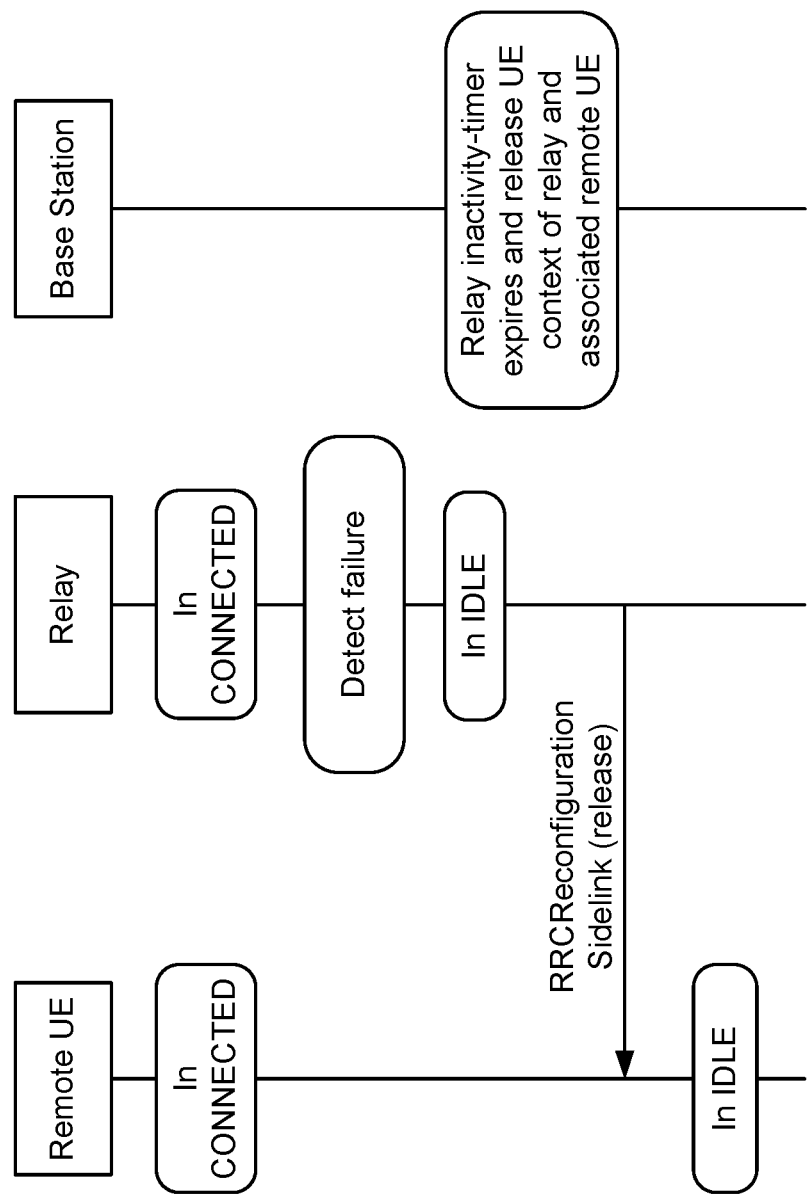
FIG. 4 is a diagram illustrating an example of releasing a remote UE due to a radio link failure at a relay, in accordance with the present disclosure.

FIG. 4 is a diagram illustrating an example 400 of releasing a remote UE due to a radio link failure at a relay, in accordance with the present disclosure. As shown in FIG. 4, example 400 includes communication between a remote UE (e.g., UE 120*e*), a relay (e.g., UE 120*a*), and a base station (e.g., base station 110*a*). In some aspects, the remote UE, the relay, and the base station may be included in a wireless network such as wireless network 100. The remote UE, the relay, and the base station may communicate on a wireless sidelink.

As shown in FIG. 4, the remote UE and the relay may initially be in an RRC connected state. The relay may detect a failure on a Uu link between the relay and the base station when the remote UE (or multiple remote UEs) are connected to the relay. The failure may be, for example, due to a Uu radio link failure, a Uu handover failure, or a Uu reconfiguration failure, or another reason for a Uu link failure. The relay may trigger an NR reestablishment after detecting the a Uu link failure, such as the Uu radio link failure, the Uu handover failure, and/or the Uu reconfiguration failure. The relay may then enter an RRC idle state. After the relay enters into the RRC idle state, a relay inactivity timer may expire, and the base station may release context information of the relay and associated remote UEs. The relay may send an RRC reconfiguration sidelink message to the remote UE to indicate that the remote UE has been released or suspended from the relay, after which point the remote UE may enter an RRC idle mode.

When the relay experiences the failure (e.g., Uu radio link failure, Uu handover failure, and/or Uu reconfiguration failure), the relay may release or suspend a PC5 link with the remote UE. The relay may stop advertising relay support in discovery messages transmitted by the relay. After the relay successfully reestablishes the Uu link with the base station, the relay UE may resume a suspended PC5 link with the remote UE and may resume advertising relay support in discovery messages transmitted by the relay.

As indicated above. FIG. 4 is provided as an example. Other examples may differ from what is described with regard to FIG. 4.

In a first approach, when the relay experiences the failure and releases the remote UE, the remote UE may also experience a failure and search for a new relay. Alternatively, the remote UE may receive (e.g., from the relay) an RRC reconfiguration to search for the new relay. When a PC5 link between the remote UE and the relay becomes degraded (e.g., when the relay travels outside a defined range of the remote UE), the remote UE may search for the new relay. Searching for the new relay may take a prolonged period of time during which the remote UE may be unable to receive data.

In a second approach, the relay experiences the failure and suspends the PC5 link with the remote UE. Later, the relay may resume the PC5 link after the relay successfully recovers a Uu link with a base station. However, this second approach may also take a prolonged period of time, during which the remote UE may be unable to send and/or receive data. Therefore, both approaches may incur a switching latency for the remote UE.

In various aspects of techniques and apparatuses described herein, a remote UE may receive a relay switch command that indicates a target relay for the remote UE. The remote UE may receive the relay switch command from a source relay that is connected to the remote UE. The remote UE may establish or set up a PC5 link with the target relay indicated in the relay switch command. The remote UE may switch from the source relay to the target relay via an intra-cell relay switching, as both the source relay and the target relay may be connected to a same base station. The remote UE may receive the relay switch command when a certain radio condition associated with the source relay is satisfied. The remote UE may not search for the target relay itself, but rather may receive the indication of the target relay in the relay switch command, which may reduce a switching latency for the remote UE. As a result, a period of time in which the remote UE is unable to receive data when performing an intra-cell relay switching may be reduced. In this way, the remote UE and relay may conserve computing, network, and communication resources that may otherwise be consumed for relay switching.

Figure 5:
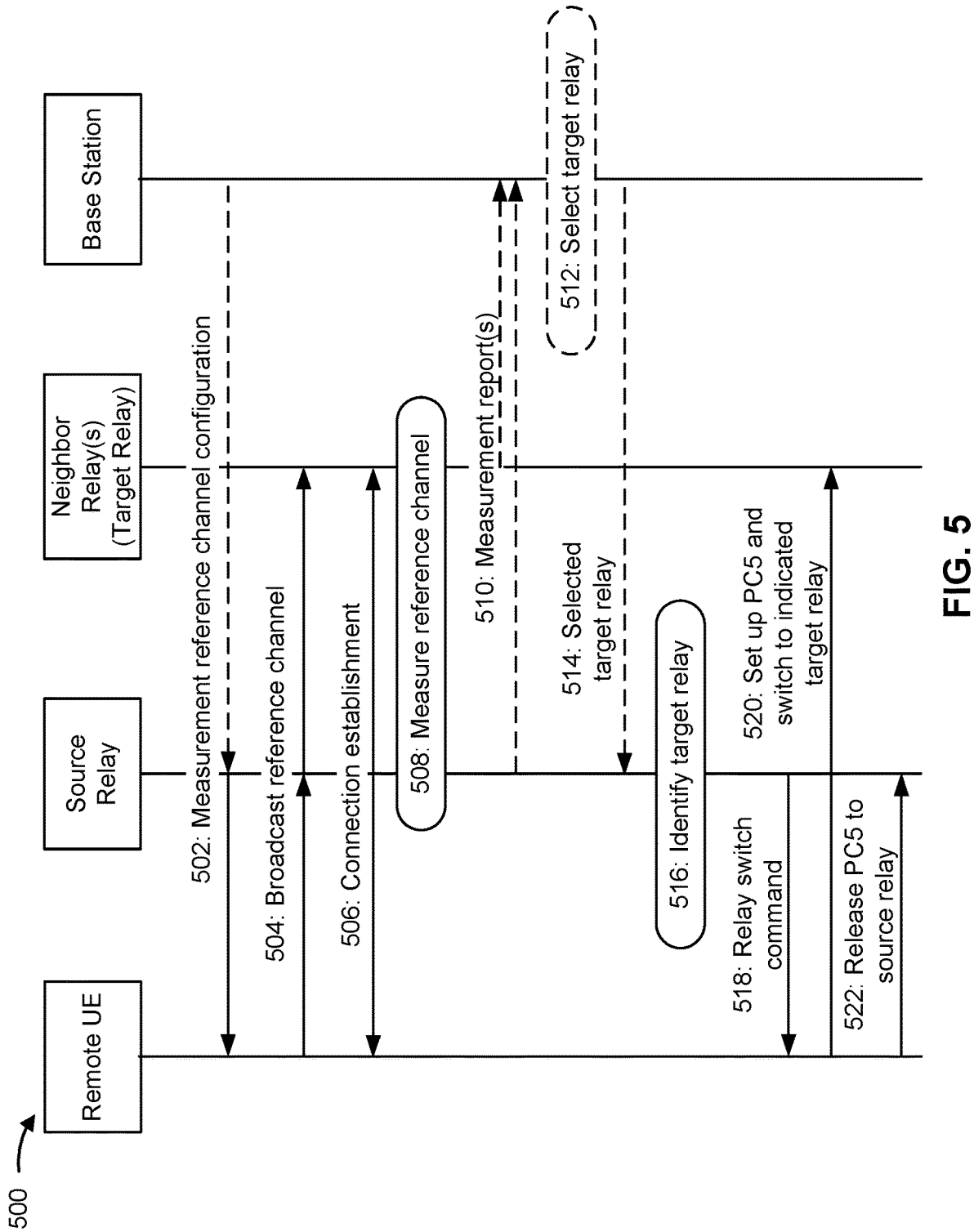
FIG. 5 is a diagram illustrating an example associated with relay switching for a remote user equipment, in accordance with the present disclosure.

FIG. 5 is a diagram illustrating an example 500 associated with relay switching for a remote user equipment, in accordance with the present disclosure. As shown in FIG. 5, example 500 includes communication between a remote UE (e.g., UE 120e), a relay (e.g., UE 120a), neighbor relay(s) (e.g., UE 120f), and a base station (e.g., base station 110). In some aspects, the remote UE, the relay, the neighbor relay, and the base station may be included in a wireless network such as wireless network 100. The remote UE, the relay, the neighbor relay, and the base station may communicate on a wireless sidelink.

As shown by reference number 502, the source relay may transmit a measurement reference channel configuration to the remote UE. The source relay may determine the measurement reference channel configuration and send the measurement reference channel configuration to the remote UE. The measurement reference channel configuration may include various parameters that configure the remote UE to subsequently transmit a reference channel.

In some aspects, the base station may determine the measurement reference channel configuration and send the measurement reference channel configuration to the source relay. The source relay may receive the measurement reference channel configuration from the base station, and the source relay may forward, and the remote UE receive, the measurement reference channel configuration.

In some aspects, the remote UE may receive the measurement reference channel configuration from the source relay when a PC5 link between the remote UE and the source relay is favorable. In other words, the remote UE may receive the measurement reference channel configuration prior to a failure that occurs at the source relay (e.g., a link failure that occurs between the source relay and the base station).

As shown by reference number 504, the remote UE may transmit or broadcast the reference channel based at least in part on the measurement reference channel configuration. The reference channel may include information (e.g., a remote UE identifier) associated with the remote UE that transmits the reference channel. The reference channel may be received or detected by a plurality of relays, such as the source relay and the neighbor relay(s). The remote UE may transmit or broadcast the reference channel to enable a measurement of the reference channel. In some aspects, the remote UE may transmit the reference signal to the plurality of relays and/or the base station.

In some aspects, the remote UE may transmit or broadcast the reference channel based at least in part on an occurrence of a triggering event. For example, the remote UE may transmit or broadcast the reference channel when a certain radio condition of the source relay is satisfied. For example, the remote UE may transmit or broadcast the reference channel when a channel condition between the remote UE and the source relay degrades to below a certain threshold. In some aspects, the remote UE may transmit or broadcast the reference channel in a periodic or aperiodic manner.

In some aspects, the remote UE may receive a configuration from the source relay that indicates a transmission mode for the remote UE to use when transmitting the reference channel. The transmission mode may instruct the remote UE to transmit the reference channel based at least in part on the occurrence of the triggering event. The transmission mode may instruct the remote UE to periodically transmit the reference channel. The transmission mode may instruct the remote UE to aperiodically transmit the reference channel.

In some aspects, the remote UE may receive a discovery signal over a physical sidelink shared channel (PSSCH) or a physical sidelink control channel (PSCCH). For example, the remote UE may receive a demodulation reference signal from the relay over the PSSCH and/or the PSCCH. The remote UE may measure a path loss based at least in part on the demodulation reference signal. The remote UE may control a power of the reference signal based at least in part on the path loss. The remote UE may apply an open-loop power control for the reference channel transmitted by the remote UE.

In some aspects, the remote UE may transmit the reference channel over a PSSCH. The reference channel may be transmitted over a PSSCH that is used for discovery and/or communication. The reference channel may be associated with a first sidelink resource pool, and discovery and communication performed over the PSSCH may be associated with a second sidelink resource pool. The reference channel may be distinguishable from discovery and communication performed over the PSSCH based at least in part on an indication in a payload of the PSSCH. The reference channel may be distinguishable from discovery and communication performed over the PSSCH based at least in part on a numerology associated with the reference channel. In some aspects, the reference channel may be a new channel that is separate from the PSSCH used for discovery and/or communication.

In some aspects, the reference channel may be associated with a first numerology, and discovery and/or communication performed over the PSSCH may be associated with a second numerology. In some aspects, the reference channel may be associated with a numerology, and discovery and/or communication performed over the PSSCH is associated with the numerology. In other words, the reference channel and the discovery and/or communication performed over the PSSCH may be associated with a same numerology.

As shown by reference number 506, the remote UE may establish a connection with the neighbor relay(s) which may be candidate target relays. The remote UE may establish the connection with the neighbor relay(s) which may be candidate target relays in preparation for a switch to one of the neighbor relays. In some cases, the remote UE may establish the connection with the neighbor relay(s) before broadcasting the reference channel to the source relay and/or the neighbor relay(s).

As shown by reference number 508, the source relay and/or the neighbor relay(s) may each receive the reference channel. The source relay and/or the neighbor relay(s) may each measure the reference channel received from the UE. In other words, the source relay and/or the neighbor relay(s) may each perform a measurement of the reference channel. The measurement may be an RSRP measurement, an RSSI measurement, and/or an RSRQ measurement. The source relay and/or the neighbor relay(s) may each generate a measurement report based at least in part on respective measurements of the reference channel received from the remote UE. In some aspects, the base station may measure the reference channel received from the UE.

In some aspects, as shown by reference number 510, the source relay and/or the neighbor relay(s) may each transmit a measurement report to the base station.

In some aspects, as shown by reference number 512, the base station may select a target relay neighbor relay(s) based at least in part on measurement report(s) received from the source relay and/or the neighbor relay(s). For example, based at least in part on the measurement report(s), the base station may select one of the neighbor relay(s) as the target relay. The base station may select one of the neighbor relay(s) as the target relay when the measurement report transmitted by the selected target relay indicates favorable channel conditions (e.g., the best conditions) with the remote UE, as compared to channel conditions between other neighbor relays (if any) and the remote UE. In some aspects, the base station may select the target relay neighbor relay(s) based at least in part on a measurement of the reference channel performed at the base station.

In some aspects, as shown by reference number 514, the base station may send an indication of the target relay to the source relay. In other words, the base station may indicate to the source relay that the base station has selected one of the neighbor relay(s) to be the target relay for the remote UE.

As shown by reference number 516, the source relay may identify the target relay for the remote UE. In some aspects, the source relay may identify the target relay based at least in part on the measurement reports(s) generated at the source relay and/or the neighbor relay(s). For example, the neighbor relay(s) may each transmit a measurement report to the source relay, and the source relay may select the target relay for the remote UE based at least in part on the measurement report(s). For example, based at least in part on the measurement report(s), the source relay may select the neighbor relay as the target relay. The source relay may select the neighbor relay as the target relay when the measurement report transmitted by the neighbor relay indicates favorable channel conditions between the neighbor relay and the remote UE, as compared to channel conditions between other neighbor relays and the remote UE.

Alternatively, the source relay may identify the target relay based at least in part on the indication of the target relay received from the base station.

As shown by reference number 518, the source relay may transmit a command (e.g., a relay switch command) to the remote UE. The command may indicate the target relay selected for the remote UE (e.g., by the source relay or the base station). The source relay may transmit the command to the remote UE in sidelink control information, or the source relay may transmit the command to the remote UE in a PC5 medium access control (MAC)-control element (CE). In other words, the sidelink control information or the PC5 MAC-CE may include an indication of the target relay for the remote UE.

In some aspects, the remote UE may receive the command from the base station via the source relay. In other words, the base station may determine the target relay for the remote UE, and the base station may transmit the command (e.g., the relay switch command) to the source relay, and the source relay may forward the command to the remote UE.

As shown by reference number 520, the remote UE may communicate with the target relay to set up a PC5 link between the remote UE and the target relay. The remote UE may communicate with the target relay to switch to the target relay. The remote UE may set up the PC5 link and switch to the target relay based at least in part on the command received from the source relay. The switch from the source relay to the target relay may be an intra-cell relay switch.

As shown by reference number 522, the remote UE may communicate with the source relay to release the PC5 link between the remote UE and the source relay. After the PC5 link between the remote UE and the source relay is released, the remote UE may no longer communicate with the source relay.

As indicated above, FIG. 5 is provided as an example. Other examples may differ from what is described with regard to FIG. 5.

Figure 6:
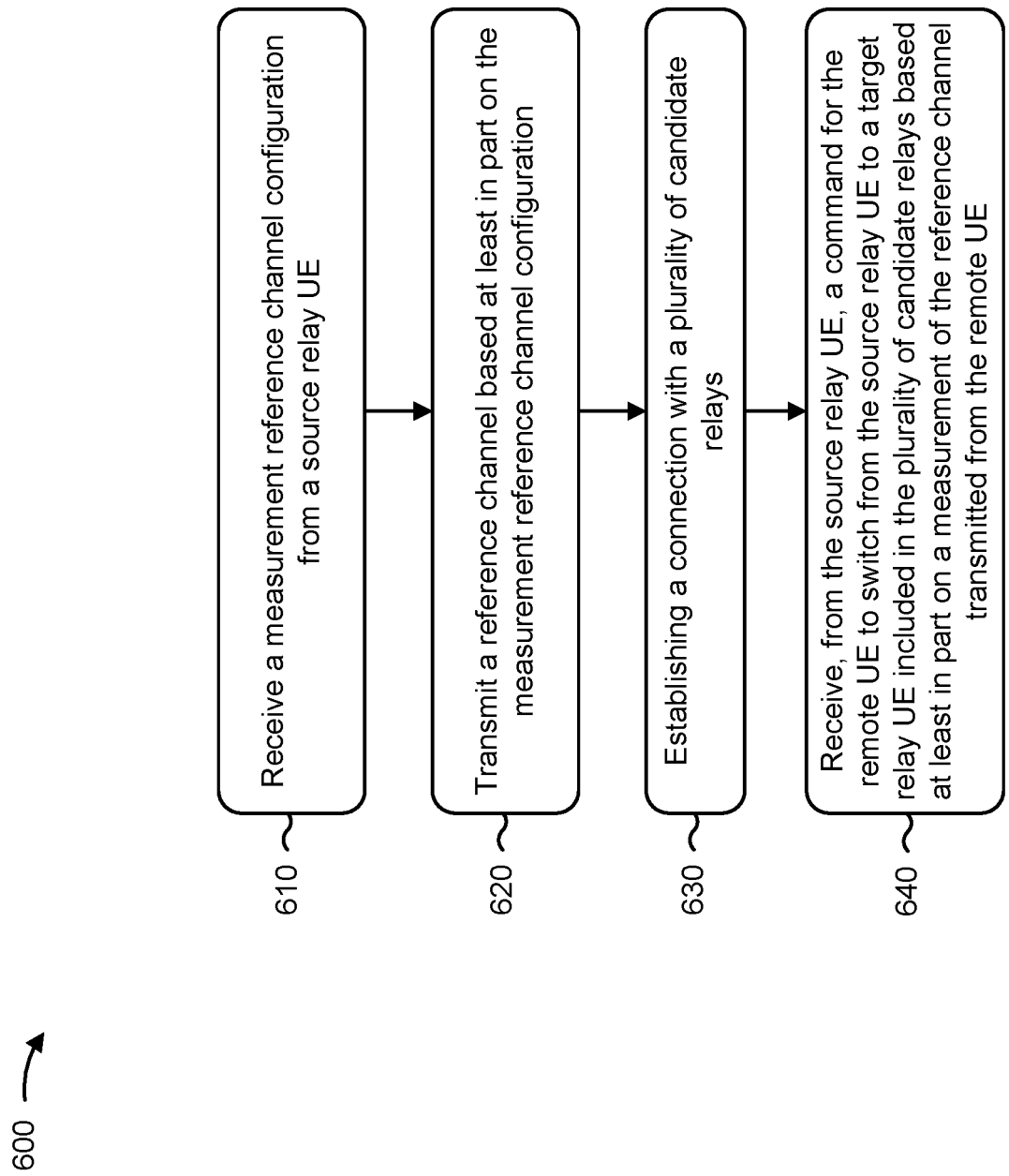
FIG. 6-8 are diagrams illustrating example processes associated with relay switching for a remote user equipment, in accordance with the present disclosure.

FIG. 6 is a diagram illustrating an example process 600 performed, for example, by a remote UE, in accordance with the present disclosure. Example process 600 is an example where the remote UE (e.g., UE 120e) performs operations associated with relay switching for a remote user equipment.

As shown in FIG. 6, in some aspects, process 600 may include receiving a measurement reference channel configuration from a source relay (block 610). For example, the remote UE (e.g., using reception component 902, depicted in FIG. 9) may receive a measurement reference channel configuration from a source relay, as described above with regard to reference number 502 in FIG. 5.

As further shown in FIG. 6, in some aspects, process 600 may include transmitting a reference channel based at least in part on the measurement reference channel configuration (block 620). For example, the remote UE (e.g., using transmission component 904, depicted in FIG. 9) may transmit a reference channel based at least in part on the measurement reference channel configuration, as described above with regard to reference number 504 in FIG. 5.

As further shown in FIG. 6, in some aspects, process 600 may include establishing a connection with a plurality of candidate relays (block 630). For example, the remote UE (e.g., using reception component 902, depicted in FIG. 9) may establish a connection with a plurality of candidate relays, as described above with regard to reference number 506 in FIG. 5.

As further shown in FIG. 6, in some aspects, process 600 may include receiving, from the source relay, a command for the remote UE to switch from the source relay to a target relay selected from the plurality of candidate relays based at least in part on a measurement of the reference channel transmitted from the remote UE (block 640). For example, the remote UE (e.g., using reception component 902, depicted in FIG. 9) may receive, from the source relay, a command for the remote UE to switch from the source relay to a target relay included in the plurality of candidate relays based at least in part on a measurement of the reference channel transmitted from the remote UE, as described above with regard to reference number 518 in FIG. 5.

Process 600 may include additional aspects, such as any single aspect or any combination of aspects described below and/or in connection with one or more other processes described elsewhere herein.

In a first aspect, receiving the measurement reference channel configuration comprises receiving the measurement reference channel configuration from a base station via the source relay. In a second aspect, alone or in combination with the first aspect, transmitting the reference channel comprises broadcasting the reference channel to a plurality of relays connected to a same base station, wherein the plurality of relays include the source relay and the target relay. In a third aspect, alone or in combination with one or more of the first and second aspects, receiving the command comprises receiving the command from a base station via the source relay.

In a fourth aspect, alone or in combination with one or more of the first through third aspects, the command received from the source relay is a relay switch command included in sidelink control information. In a fifth aspect, alone or in combination with one or more of the first through fourth aspects, the command received from the source relay is a relay switch command included in a PC5 MAC-CE. In a sixth aspect, alone or in combination with one or more of the first through fifth aspects, process 600 includes transmitting, to the target relay, a message to set up a PC5 interface between the remote UE and the target relay.

In a seventh aspect, alone or in combination with one or more of the first through sixth aspects, process 600 includes switching from the source relay to the target relay based at least in part on the command received from the source relay. In an eighth aspect, alone or in combination with one or more of the first through seventh aspects, process 600 includes releasing a PC5 interface between the remote UE and the source relay after switching to the target relay. In a ninth aspect, alone or in combination with one or more of the first through eighth aspects, transmitting the reference channel comprises transmitting the reference channel over a sidelink shared channel.

In a tenth aspect, alone or in combination with one or more of the first through ninth aspects, the reference channel is associated with a first sidelink resource pool, and discovery and communication performed over the sidelink shared channel is associated with a second sidelink resource pool. In an eleventh aspect, alone or in combination with one or more of the first through tenth aspects, the reference channel is distinguishable from discovery and communication performed over the sidelink shared channel based at least in part on an indication in a payload of the sidelink shared channel. In a twelfth aspect, alone or in combination with one or more of the first through eleventh aspects, the reference channel is associated with a first numerology, and discovery and communication performed over the sidelink shared channel is associated with a second numerology.

In a thirteenth aspect, alone or in combination with one or more of the first through twelfth aspects, the reference channel is associated with a numerology, and discovery and communication performed over the sidelink shared channel is associated with the numerology. In a fourteenth aspect, alone or in combination with one or more of the first through thirteenth aspects, transmitting the reference channel comprises transmitting the reference channel based at least in part on an occurrence of a triggering event, wherein the triggering event occurs when a radio condition of the source relay is satisfied. In a fifteenth aspect, alone or in combination with one or more of the first through fourteenth aspects, transmitting the reference channel comprises transmitting the reference channel periodically from the remote UE.

In a sixteenth aspect, alone or in combination with one or more of the first through fifteenth aspects, transmitting the reference channel comprises transmitting the reference channel aperiodically from the remote UE. In a seventeenth aspect, alone or in combination with one or more of the first through sixteenth aspects, process 600 includes receiving, from the source relay, a configuration that indicates a transmission mode for the remote UE to use when transmitting the reference channel.

In an eighteenth aspect, alone or in combination with one or more of the first through seventeenth aspects, process 600 includes measuring a path loss based at least in part on a demodulation reference signal received from the source relay, and controlling a power of the reference channel based at least in part on the path loss. In a nineteenth aspect, alone or in combination with one or more of the first through eighteenth aspects, the switch from the source relay to a target relay is an intra-cell relay switch.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
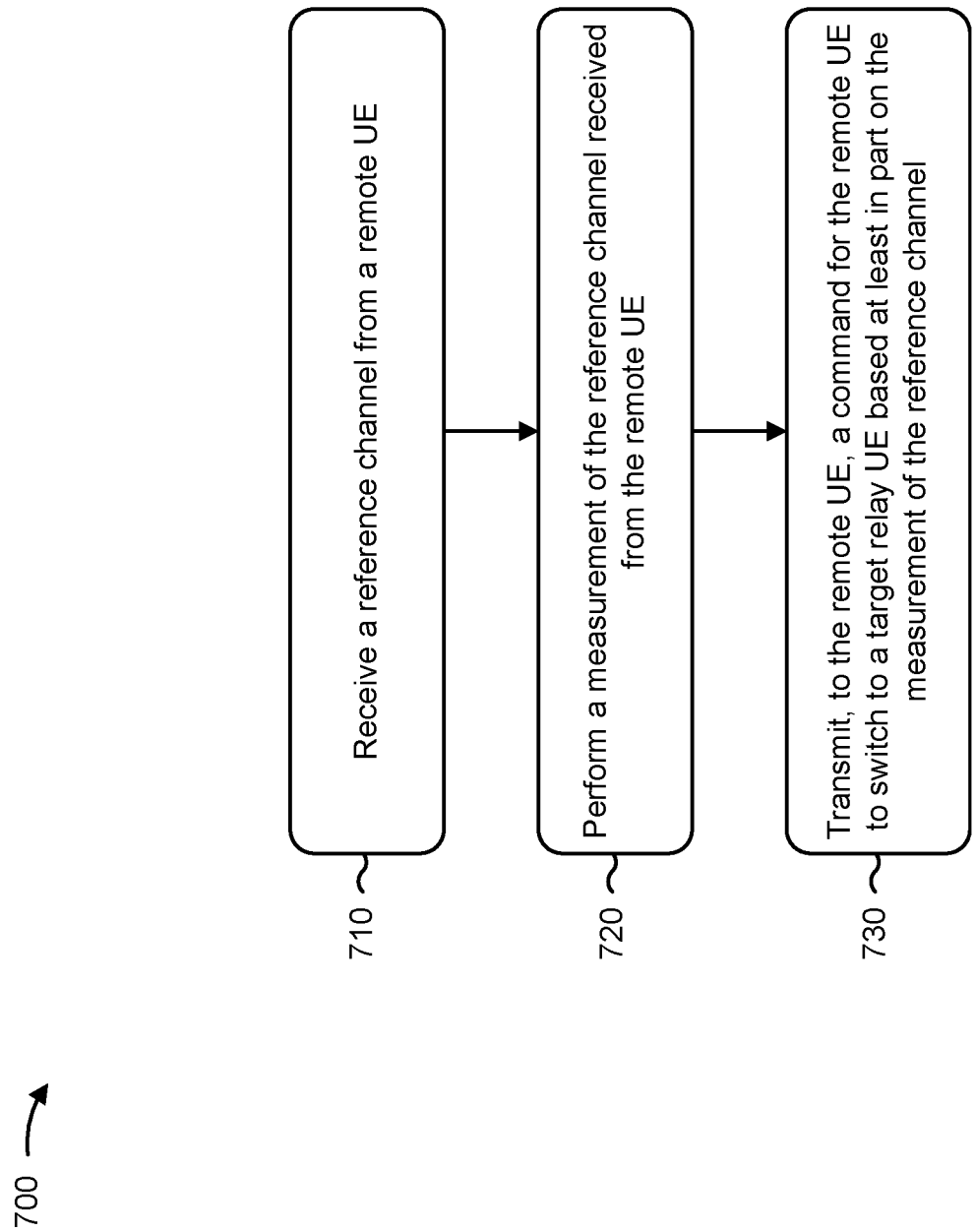

FIG. 7 is a diagram illustrating an example process 700 performed, for example, by a relay, in accordance with the present disclosure. Example process 700 is an example where the relay (e.g., UE 120a) performs operations associated with relay switching for a remote user equipment.

As shown in FIG. 7, in some aspects, process 700 may include receiving a reference channel from a remote UE (block 710). For example, the relay (e.g., using reception component 1002, depicted in FIG. 10) may receive a reference channel from a remote UE, as described above with regard to reference number 504 in FIG. 5.

As further shown in FIG. 7, in some aspects, process 700 may include performing a measurement of the reference channel received from the remote UE (block 720). For example, the relay (e.g., using measurement component 1008, depicted in FIG. 10) may perform a measurement of the reference channel received from the remote UE, as described above with regard to reference number 506 in FIG. 5.

As further shown in FIG. 7, in some aspects, process 700 may include transmitting, to the remote UE, a command for the remote UE to switch to a target relay based at least in part on the measurement of the reference channel (block 730). For example, the relay (e.g., using transmission component 1004, depicted in FIG. 10) may transmit, to the remote UE, a command for the remote UE to switch to a target relay based at least in part on the measurement of the reference channel, as described above with regard to reference number 516 in FIG. 5.

Process 700 may include additional aspects, such as any single aspect or any combination of aspects described below and/or in connection with one or more other processes described elsewhere herein.

In a first aspect, process 700 includes transmitting a measurement reference channel configuration to the remote UE, wherein the reference channel received from the remote UE is based at least in part on the measurement reference channel configuration. In a second aspect, alone or in combination with the first aspect, process 700 includes receiving the measurement reference channel configuration from a base station. In a third aspect, alone or in combination with one or more of the first and second aspects, process 700 includes selecting the target relay based at least in part on the measurement of the reference channel.

In a fourth aspect, alone or in combination with one or more of the first through third aspects, process 700 includes sending, to a base station, a measurement report that includes the measurement of the reference channel, and receiving, from the base station, an indication of the target relay based at least in part on the measurement report. In a fifth aspect, alone or in combination with one or more of the first through fourth aspects, receiving the reference channel comprises receiving the reference channel via a broadcast from the remote UE.

In a sixth aspect, alone or in combination with one or more of the first through fifth aspects, the command is a relay switch command included in sidelink control information. In a seventh aspect, alone or in combination with one or more of the first through sixth aspects, the command is a relay switch command included in a PC5 MAC-CE. In an eighth aspect, alone or in combination with one or more of the first through seventh aspects, process 700 includes receiving, from the remote UE, an indication that a PC5 interface with the remote UE is to be released.

In a ninth aspect, alone or in combination with one or more of the first through eighth aspects, the reference channel is received from the remote UE over a sidelink shared channel. In a tenth aspect, alone or in combination with one or more of the first through ninth aspects, the reference channel is associated with a first sidelink resource pool, and discovery and communication performed over the sidelink shared channel is associated with a second sidelink resource pool. In an eleventh aspect, alone or in combination with one or more of the first through tenth aspects, the reference channel is distinguishable from discovery and communication performed over the sidelink shared channel based at least in part on an indication in a payload of the sidelink shared channel.

In a twelfth aspect, alone or in combination with one or more of the first through eleventh aspects, the reference channel is associated with a first numerology, and discovery and communication performed over the sidelink shared channel is associated with a second numerology. In a thirteenth aspect, alone or in combination with one or more of the first through twelfth aspects, the reference channel is associated with a numerology, and discovery and communication performed over the sidelink shared channel is associated with the numerology.

In a fourteenth aspect, alone or in combination with one or more of the first through thirteenth aspects, the reference channel is received from the remote UE based at least in part on an occurrence of a triggering event, wherein the triggering event occurs when a radio condition of the relay is satisfied. In a fifteenth aspect, alone or in combination with one or more of the first through fourteenth aspects, the reference channel is received periodically from the remote UE. In a sixteenth aspect, alone or in combination with one or more of the first through fifteenth aspects, the reference channel is received aperiodically from the remote UE. In a seventeenth aspect, alone or in combination with one or more of the first through sixteenth aspects, process 700 includes transmitting, to the remote UE, a configuration that indicates a transmission mode for the remote UE to use when transmitting the reference channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
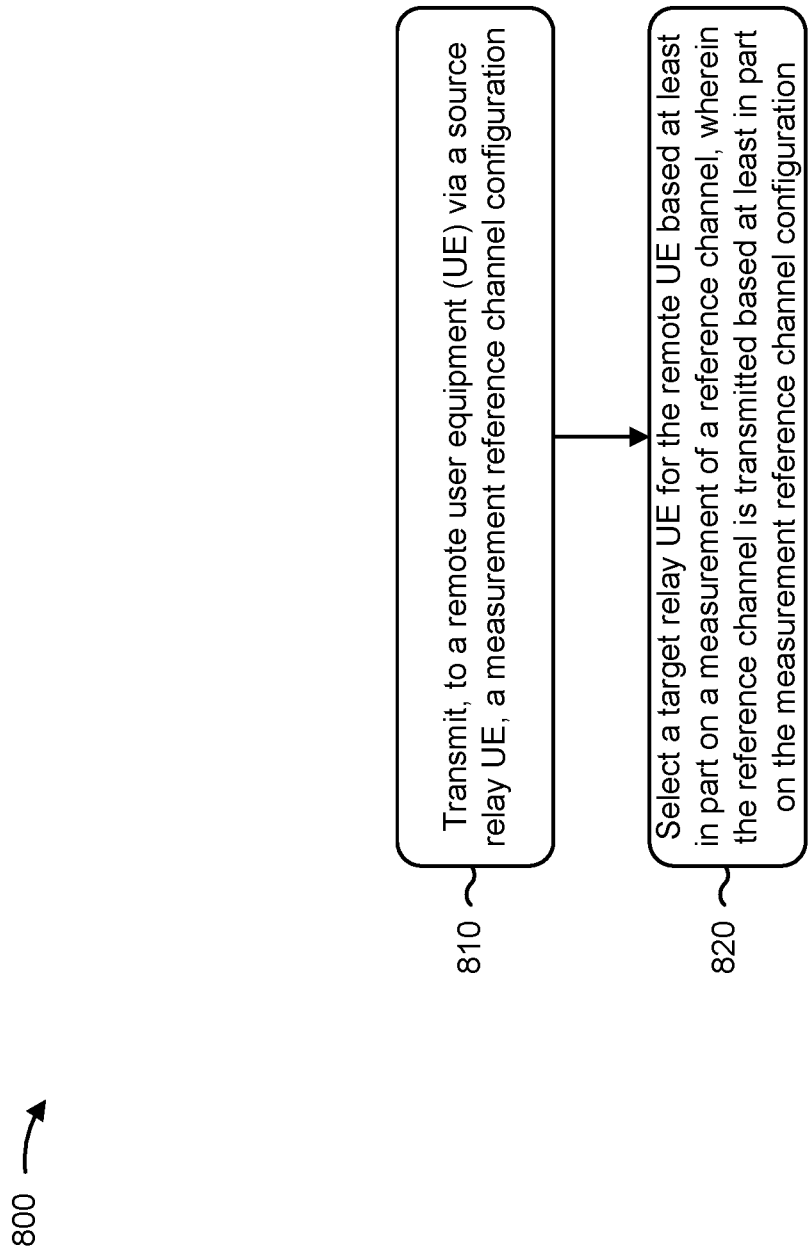

FIG. 8 is a diagram illustrating an example process 800 performed, for example, by a base station, in accordance with the present disclosure. Example process 800 is an example where the base station (e.g., base station 110) performs operations associated with relay switching for a remote user equipment.

As shown in FIG. 8, in some aspects, process 800 may include transmitting, to a remote UE via a source relay, a measurement reference channel configuration (block 810). For example, the base station (e.g., using transmission component 1104, depicted in FIG. 11) may transmit, to a remote UE via a source relay, a measurement reference channel configuration, as described above with regard to reference number 502 in FIG. 5.

As further shown in FIG. 8, in some aspects, process 800 may include selecting a target relay for the remote UE based at least in part on a measurement of a reference channel, wherein the reference channel is transmitted based at least in part on the measurement reference channel configuration (block 820). For example, the base station (e.g., using selection component 1108, depicted in FIG. 11) may select a target relay for the remote UE based at least in part on a measurement of a reference channel, wherein the reference channel is transmitted based at least in part on the measurement reference channel configuration, as described above with regard to reference number 510 in FIG. 5.

Process 800 may include additional aspects, such as any single aspect or any combination of aspects described below and/or in connection with one or more other processes described elsewhere herein.

In a first aspect, process 800 includes sending, to the remote UE via the source relay, an indication of the target relay. In a second aspect, alone or in combination with the first aspect, the reference channel is associated with a sidelink shared channel. In a third aspect, alone or in combination with one or more of the first and second aspects, the reference channel is associated with a first sidelink resource pool, and discovery and communication performed over the sidelink shared channel is associated with a second sidelink resource pool.

In a fourth aspect, alone or in combination with one or more of the first through third aspects, the reference channel is distinguishable from discovery and communication performed over the sidelink shared channel based at least in part on an indication in a payload of the sidelink shared channel. In a fifth aspect, alone or in combination with one or more of the first through fourth aspects, the reference channel is associated with a first numerology, and discovery and communication performed over the sidelink shared channel is associated with a second numerology. In a sixth aspect, alone or in combination with one or more of the first through fifth aspects, the reference channel is associated with a numerology, and discovery and communication performed over the sidelink shared channel is associated with the numerology.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
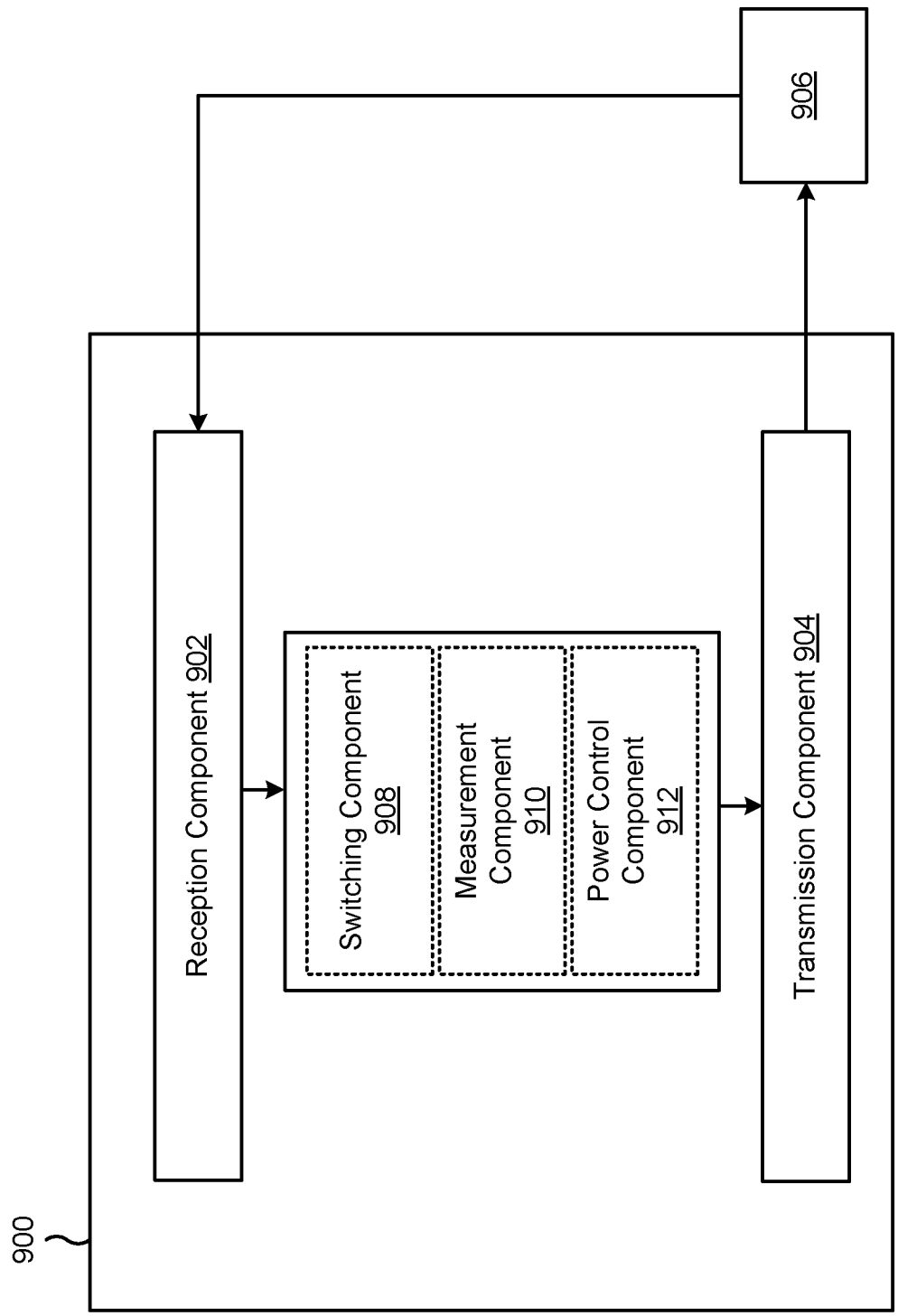
FIGS. 9-11 are block diagrams of example apparatuses for wireless communication, in accordance with the present disclosure.

FIG. 9 is a block diagram of an example apparatus 900 for wireless communication. The apparatus 900 may be a remote UE, or a remote UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a switching component 908, a measurement component 910, or a power control component 912, among other examples.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6. In some aspects, the apparatus 900 and/or one or more components shown in FIG. 9 may include one or more components of the remote UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the remote UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the remote UE described above in connection with FIG. 2. In some aspects, the transmission component 904 may be collocated with the reception component 902 in a transceiver.

The reception component 902 may receive a measurement reference channel configuration from a source relay. The transmission component 904 may transmit a reference channel based at least in part on the measurement reference channel configuration. The reception component 902 may receive, from the source relay, a command for the remote UE to switch from the source relay to a target relay based at least in part on a measurement of the reference channel transmitted from the remote UE.

In some aspects, the reception component 902 may receive the measurement reference channel configuration from a base station via the source relay. In some aspects, the reception component 902 may receive the command from a base station via the source relay. In some aspects, the reception component 902 may receive, from the source relay, a configuration that indicates a transmission mode for the remote UE to use when transmitting the reference channel.

In some aspects, the transmission component 904 may broadcast the reference channel to a plurality of relays connected to a same base station, wherein the plurality of relays include the source relay and the target relay. In some aspects, the transmission component 904 may transmit, to the target relay, a message to set up a PC5 interface between the remote UE and the target relay. In some aspects, the transmission component 904 may transmit the reference channel over a sidelink shared channel. In some aspects, the transmission component 904 may transmit the reference channel based at least in part on an occurrence of a triggering event, wherein the triggering event occurs when a radio condition of the source relay is satisfied. In some aspects, the transmission component 904 may transmit the reference channel periodically from the remote UE. In some aspects, the transmission component 904 may transmit the reference channel comprises transmitting the reference channel aperiodically from the remote UE.

The switching component 908 may switch from the source relay to the target relay based at least in part on the command received from the source relay. The switching component 908 may release a PC5 interface between the remote UE and the source relay after switching to the target relay. In some aspects, the switching component 908 may include one or more antennas, a demodulator, a MIMO detector, a receive processor, a modulator, a transmit MIMO processor, a transmit processor, a controller/processor, a memory, or a combination thereof, of the remote UE described above in connection with FIG. 2.

The measurement component 910 may measure a path loss based at least in part on a demodulation reference signal received from the source relay. In some aspects, the measurement component 910 may include one or more antennas, a demodulator, a MIMO detector, a receive processor, a modulator, a transmit MIMO processor, a transmit processor, a controller/processor, a memory, or a combination thereof, of the remote UE described above in connection with FIG. 2.

The power control component 912 may control a power of the reference channel based at least in part on the path loss. In some aspects, the power control component 912 may include one or more antennas, a demodulator, a MIMO detector, a receive processor, a modulator, a transmit MIMO processor, a transmit processor, a controller/processor, a memory, or a combination thereof, of the remote UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
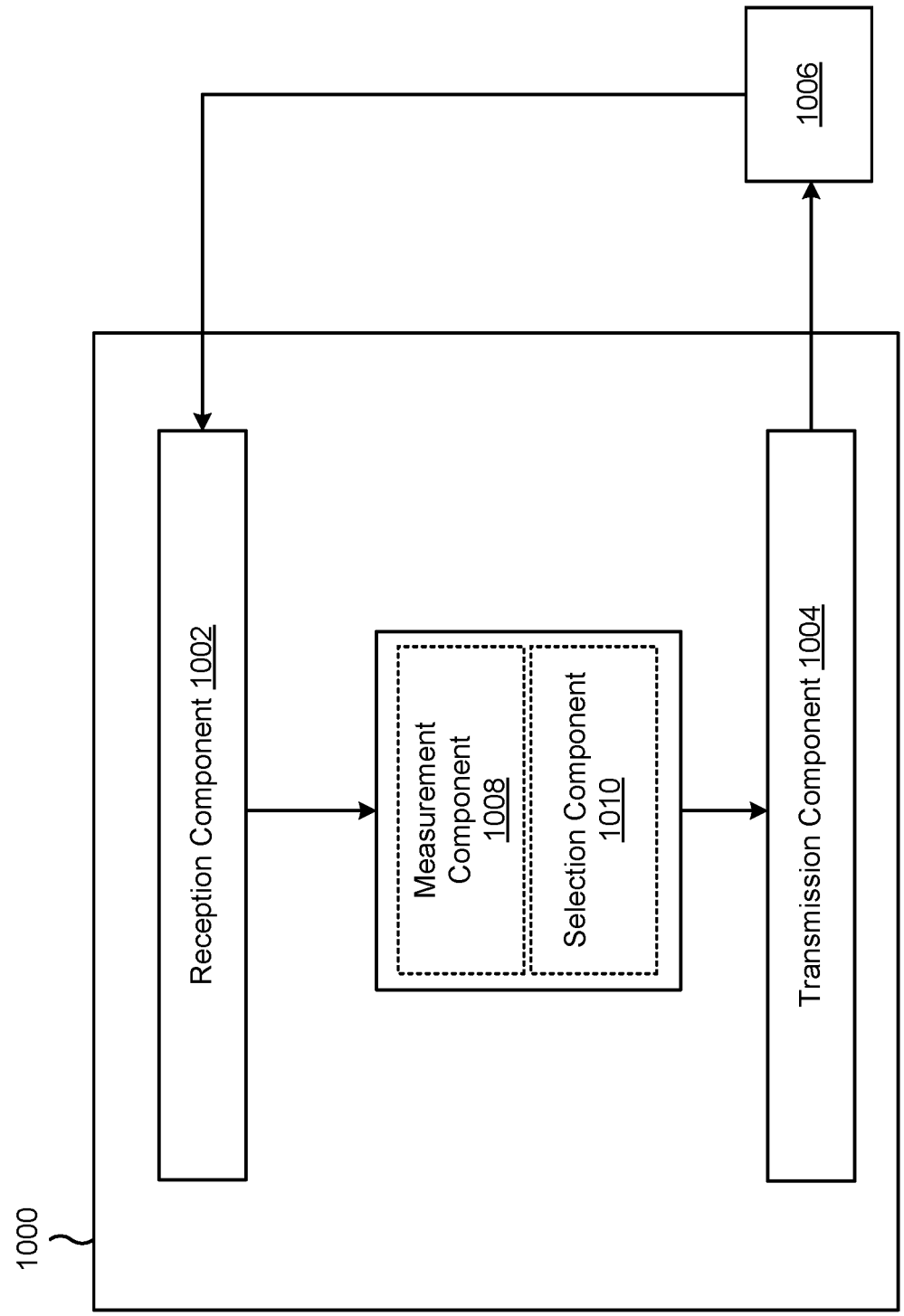

FIG. 10 is a block diagram of an example apparatus 1000 for wireless communication. The apparatus 1000 may be a relay, or a relay may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a measurement component 1008, or a selection component 1010, among other examples.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the relay described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the relay described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the relay described above in connection with FIG. 2. In some aspects, the transmission component 1004 may be collocated with the reception component 1002 in a transceiver.

The reception component 1002 may receive a reference channel from a remote UE. The measurement component 1008 may perform a measurement of the reference channel received from the remote UE. The transmission component 1004 may transmit, to the remote UE, a command for the remote UE to switch from the source relay to a target relay based at least in part on the measurement of the reference channel.

In some aspects, the measurement component 1008 may include one or more antennas, a demodulator, a MIMO detector, a receive processor, a modulator, a transmit MIMO processor, a transmit processor, a controller/processor, a memory, or a combination thereof, of the remote UE described above in connection with FIG. 2.

In some aspects, the transmission component 1004 may transmit a measurement reference channel configuration to the remote UE, wherein the reference channel received from the remote UE is based at least in part on the measurement reference channel configuration. In some aspects, the transmission component 1004 may transmit, to the remote UE, a configuration that indicates a transmission mode for the remote UE to use when transmitting the reference channel.

In some aspects, the reception component 1002 may receive the measurement reference channel configuration from a base station. In some aspects, the reception component 1002 may receive the reference channel comprises receiving the reference channel via a broadcast from the remote UE. In some aspects, the reception component 1002 may receive, from the remote UE, an indication that a PC5 interface with the remote UE is to be released.

In some aspects, the transmission component 1004 may send, to a base station, a measurement report that includes the measurement of the reference channel. The reception component 1002 may receive, from the base station, an indication of the target relay based at least in part on the measurement report.

In some aspects, the selection component 1010 may select the target relay based at least in part on the measurement of the reference channel. In some aspects, the selection component 1010 may include one or more antennas, a demodulator, a MIMO detector, a receive processor, a modulator, a transmit MIMO processor, a transmit processor, a controller/processor, a memory, or a combination thereof, of the remote UE described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
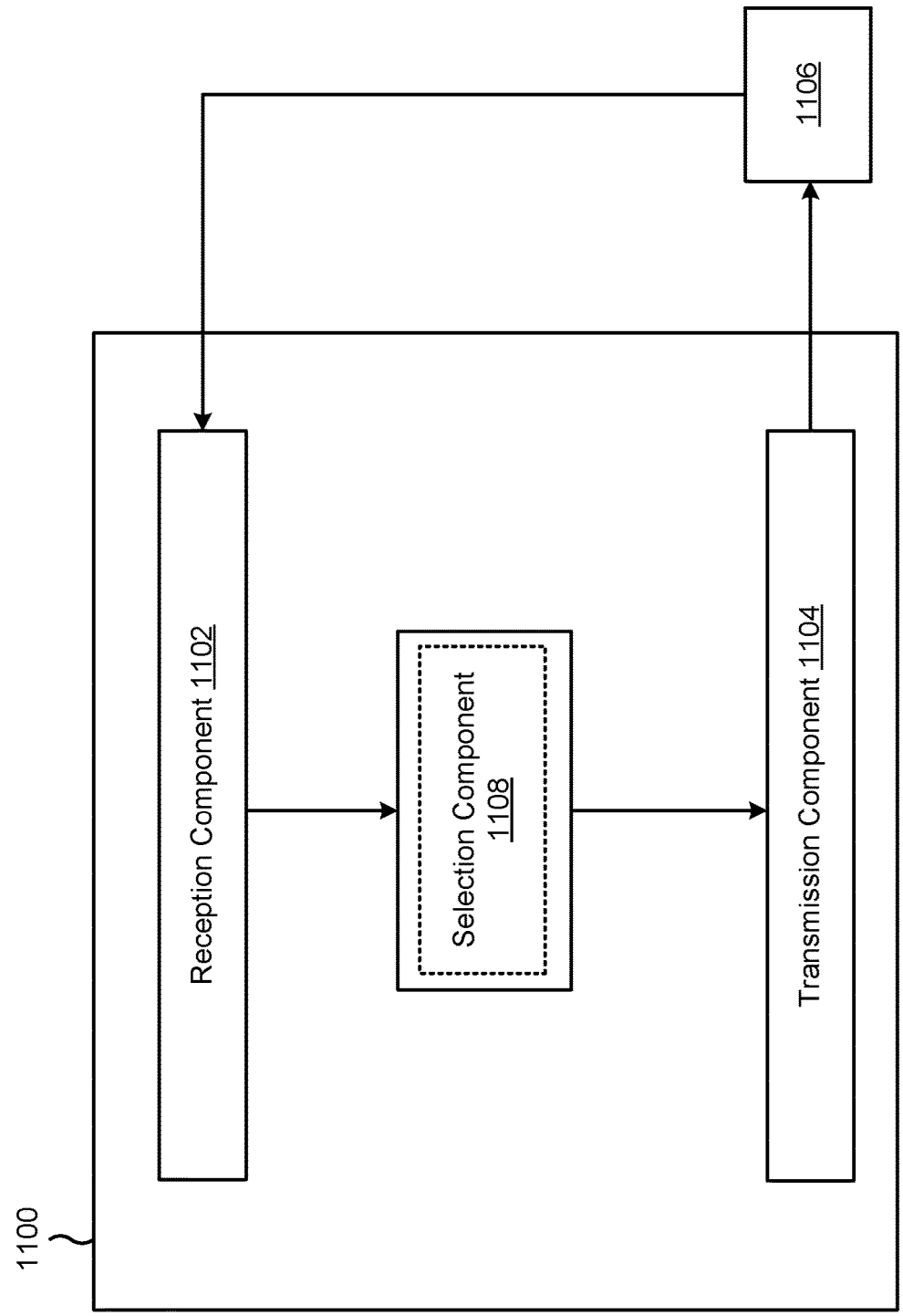

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a selection component 1108.

In some aspects, the apparatus 1100 may be configured to perform one or more operations described herein in connection with FIG. 5. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be collocated with the reception component 1102 in a transceiver.

The transmission component 1104 may transmit, to a remote UE via a source relay, a measurement reference channel configuration. The selection component 1108 may select a target relay for the remote UE based at least in part on a measurement of a reference channel, wherein the reference channel is transmitted based at least in part on the measurement reference channel configuration. In some aspects, the selection component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

In some aspects, the transmission component 1104 may send, to the remote UE via the source relay, an indication of the target relay.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a remote user equipment (UE), comprising: receiving a measurement reference channel configuration from a source relay; transmitting a reference channel based at least in part on the measurement reference channel configuration; establishing a connection with a plurality of candidate relays; and receiving, from the source relay, a command for the remote UE to switch from the source relay to a target relay included in the plurality of candidate relays based at least in part on a measurement of the reference channel transmitted from the remote UE.

Aspect 2: The method of Aspect 1, wherein: receiving the measurement reference channel configuration comprises receiving the measurement reference channel configuration from a base station via the source relay; transmitting the reference channel comprises transmitting the reference channel to one or more of a plurality of relays connected to the base station or to the base station, wherein the plurality of relays include the source relay and the target relay; and receiving the command comprises receiving the command from the base station via the source relay.

Aspect 3: The method of any of Aspects 1 through 2, wherein: the command received from the source relay is a relay switch command included in sidelink control information; or the command received from the source relay is a relay switch command included in a PC5 medium access control (MAC) control element (CE).

Aspect 4: The method of any of Aspects 1 through 3, further comprising: transmitting, to the target relay, a message to set up a PC5 interface between the remote UE and the target relay; switching from the source relay to the target relay based at least in part on the command received from the source relay; and releasing a PC5 interface between the remote UE and the source relay after switching to the target relay.

Aspect 5: The method of any of Aspects 1 through 4, wherein transmitting the reference channel comprises transmitting the reference channel over a sidelink shared channel.

Aspect 6: The method of Aspect 5, wherein: the reference channel is associated with a first sidelink resource pool, and discovery and communication performed over the sidelink shared channel is associated with a second sidelink resource pool; the reference channel is distinguishable from discovery and communication performed over the sidelink shared channel based at least in part on an indication in a payload of the sidelink shared channel; the reference channel is associated with a first numerology, and discovery and communication performed over the sidelink shared channel is associated with a second numerology; or the reference channel is associated with a numerology, and discovery and communication performed over the sidelink shared channel is associated with the numerology.

Aspect 7: The method of any of Aspects 1 through 6, wherein transmitting the reference channel comprises transmitting the reference channel based at least in part on an occurrence of a triggering event, wherein the triggering event occurs when a radio condition of the source relay is satisfied.

Aspect 8: The method of any of Aspects 1 through 7, further comprising: receiving, from the source relay, a configuration that indicates a transmission mode for the remote UE to use when transmitting the reference channel.

Aspect 9: The method of any of Aspects 1 through 8, further comprising: measuring a path loss based at least in part on a demodulation reference signal received from the source relay; and controlling a power of the reference channel based at least in part on the path loss.

Aspect 10: The method of any of Aspects 1 through 9, wherein the switch from the source relay to the target relay is an intra-cell relay switch.

Aspect 11: A method of wireless communication performed by a relay, comprising: receiving a reference channel from a remote user equipment (UE); performing a measurement of the reference channel received from the remote UE; and transmitting, to the remote UE, a command for the remote UE to switch to a target relay based at least in part on the measurement of the reference channel.

Aspect 12: The method of Aspect 11, further comprising: receiving a measurement reference channel configuration from a base station; and transmitting the measurement reference channel configuration to the remote UE, wherein the reference channel received from the remote UE is based at least in part on the measurement reference channel configuration.

Aspect 13: The method of any of Aspects 11 through 12, further comprising: selecting the target relay based at least in part on the measurement of the reference channel; receiving, from the remote UE, an indication that a PC5 interface with the remote UE is to be released; and transmitting, to the remote UE, a configuration that indicates a transmission mode for the remote UE to use when transmitting the reference channel.

Aspect 14: The method of any of Aspects 11 through 13, further comprising: sending, to a base station, a measurement report that includes the measurement of the reference channel; and receiving, from the base station, an indication of the target relay based at least in part on the measurement report.

Aspect 15: The method of any of Aspects 11 through 14, wherein receiving the reference channel comprises receiving the reference channel via a broadcast from the remote UE.

Aspect 16: The method of any of Aspects 11 through 15, wherein: the reference channel is received from the remote UE over a sidelink shared channel; the reference channel is associated with a first sidelink resource pool, and discovery and communication performed over the sidelink shared channel is associated with a second sidelink resource pool; the reference channel is distinguishable from discovery and communication performed over the sidelink shared channel based at least in part on an indication in a payload of the sidelink shared channel; or the reference channel is received periodically from the remote UE.

Aspect 17: The method of any of Aspects 11 through 16, wherein: the reference channel is associated with a first numerology, and discovery and communication performed over the sidelink shared channel is associated with a second numerology; the reference channel is associated with a numerology, and discovery and communication performed over the sidelink shared channel is associated with the numerology; the reference channel is received from the remote UE based at least in part on an occurrence of a triggering event, wherein the triggering event occurs when a radio condition of the relay is satisfied; or the reference channel is received aperiodically from the remote UE.

Aspect 18: An apparatus for wireless communication at a device, comprising a processor; memory coupled with the processor; and instructions stored in the memory and executable by the processor to cause the apparatus to perform the method of one or more of Aspects 1-10.

Aspect 19: A device for wireless communication, comprising a memory and one or more processors coupled to the memory, the one or more processors configured to perform the method of one or more of Aspects 1-10.

Aspect 20: An apparatus for wireless communication, comprising at least one means for performing the method of one or more of Aspects 1-10.

Aspect 21: A non-transitory computer-readable medium storing code for wireless communication, the code comprising instructions executable by a processor to perform the method of one or more of Aspects 1-10.

Aspect 22: A non-transitory computer-readable medium storing a set of instructions for wireless communication, the set of instructions comprising one or more instructions that, when executed by one or more processors of a device, cause the device to perform the method of one or more of Aspects 1-10.

Aspect 18: An apparatus for wireless communication at a device, comprising a processor; memory coupled with the processor; and instructions stored in the memory and executable by the processor to cause the apparatus to perform the method of one or more of Aspects 11-17.

Aspect 19: A device for wireless communication, comprising a memory and one or more processors coupled to the memory, the one or more processors configured to perform the method of one or more of Aspects 11-17.

Aspect 20: An apparatus for wireless communication, comprising at least one means for performing the method of one or more of Aspects 11-17.

Aspect 21: A non-transitory computer-readable medium storing code for wireless communication, the code comprising instructions executable by a processor to perform the method of one or more of Aspects 11-17.

Aspect 22: A non-transitory computer-readable medium storing a set of instructions for wireless communication, the set of instructions comprising one or more instructions that, when executed by one or more processors of a device, cause the device to perform the method of one or more of Aspects 11-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a remote user equipment (UE), comprising:
    receiving a measurement reference channel configuration from a source relay, the measurement reference channel configuration including a set of parameters configuring the remote UE to transmit a reference channel to a network entity or to the source relay and at least one candidate relay;
    transmitting, responsive to a channel condition between the remote UE and the source relay satisfying a threshold, the reference channel via a broadcast based at least in part on the measurement reference channel configuration, wherein the reference channel includes a remote UE identifier; and
    receiving, from the source relay, a relay switch command that indicates the at least one candidate relay as a target relay, the relay switch command being for the remote UE to switch from the source relay to the target relay, wherein receiving the relay switch command for the remote UE to switch is based at least in part on a measurement of the reference channel transmitted from the remote UE.

2. The method of claim 1, wherein:
    receiving the measurement reference channel configuration comprises receiving the measurement reference channel configuration from the network entity via the source relay;
    transmitting the reference channel comprises transmitting the reference channel to the network entity or to a plurality of relays connected to the network entity, wherein the plurality of relays include the source relay and the at least one candidate relay; and
    receiving the relay switch command comprises receiving the relay switch command from the network entity via the source relay.

3. The method of claim 1, wherein:
    the relay switch command is included in sidelink control information; or
    the relay switch command is included in a PC5 medium access control (MAC) control element (CE).

4. The method of claim 1, further comprising:
    transmitting, to the target relay, a message to set up a PC5 interface between the remote UE and the target relay;
    switching from the source relay to the target relay based at least in part on the relay switch command received from the source relay; and releasing a PC5 interface between the remote UE and the source relay after switching to the target relay.

5. The method of claim 1, wherein transmitting the reference channel comprises transmitting the reference channel over a sidelink shared channel.

6. The method of claim 5, wherein:
the reference channel is associated with a first sidelink resource pool, and discovery and communication performed over the sidelink shared channel is associated with a second sidelink resource pool;
the reference channel is distinguishable from the discovery and the communication performed over the sidelink shared channel based at least in part on an indication in a payload of the sidelink shared channel;
the reference channel is associated with a first numerology, and the discovery and the communication performed over the sidelink shared channel is associated with a second numerology; or
the reference channel is associated with a numerology, and the discovery and the communication performed over the sidelink shared channel is associated with the numerology.

7. The method of claim 1, wherein transmitting the reference channel comprises transmitting the reference channel based at least in part on an occurrence of a triggering event that occurs when a radio condition of the source relay is satisfied.

8. The method of claim 1, further comprising:
receiving, from the source relay, a configuration that indicates a transmission mode for the remote UE to use when transmitting the reference channel.

9. The method of claim 1, further comprising:
measuring a path loss based at least in part on a demodulation reference signal received from the source relay; and
controlling a power of the reference channel based at least in part on the path loss.

10. The method of claim 1, wherein the switch from the source relay to the target relay is an intra-cell relay switch.

11. A method of wireless communication performed by a relay, comprising:
receiving, from a remote user equipment (UE), a reference channel via a broadcast based at least in part on a channel condition between the remote UE and the relay satisfying a threshold, wherein the reference channel includes a remote UE identifier;
performing a measurement of the reference channel received from the remote UE; and
transmitting, to the remote UE, a relay switch command that indicates a target relay, the relay switch command being for the remote UE to switch to the target relay, wherein transmitting the relay switch command for the remote UE to switch is based at least in part on the measurement of the reference channel received from the remote UE.

12. The method of claim 11, further comprising:
receiving a measurement reference channel configuration from a network entity, the measurement reference channel configuration including a set of parameters configuring the remote UE to transmit the reference channel via the broadcast; and
transmitting the measurement reference channel configuration to the remote UE, wherein the reference channel received from the remote UE is based at least in part on the measurement reference channel configuration.

13. The method of claim 11, further comprising:
selecting the target relay based at least in part on the measurement of the reference channel;
receiving, from the remote UE, an indication that a PC5 interface with the remote UE is to be released; and
transmitting, to the remote UE, a configuration that indicates a transmission mode for the remote UE to use when transmitting the reference channel.

14. The method of claim 11, further comprising:
sending, to a network entity, a measurement report that includes the measurement of the reference channel; and
receiving, from the network entity, an indication of the target relay based at least in part on the measurement report.

15. The method of claim 11, wherein:
the reference channel is received from the remote UE over a sidelink shared channel;
the reference channel is associated with a first sidelink resource pool, and discovery and communication performed over the sidelink shared channel is associated with a second sidelink resource pool;
the reference channel is distinguishable from the discovery and the communication performed over the sidelink shared channel based at least in part on an indication in a payload of the sidelink shared channel; or
the reference channel is received periodically from the remote UE.

16. The method of claim 15, wherein:
the reference channel is associated with a first numerology, and the discovery and the communication performed over the sidelink shared channel is associated with a second numerology;
the reference channel is associated with a numerology, and the discovery and the communication performed over the sidelink shared channel is associated with the numerology;
the reference channel is received from the remote UE based at least in part on an occurrence of a triggering event that occurs when a radio condition of the relay is satisfied; or
the reference channel is received aperiodically from the remote UE.

17. A remote user equipment (UE) for wireless communication, comprising:
one or more memories; and
one or more processors, coupled to the one or more memories, configured to:
receive a measurement reference channel configuration from a source relay, the measurement reference channel configuration including a set of parameters configuring the remote UE to transmit a reference channel to a network entity or to the source relay and at least one candidate relay;
transmit, responsive to a channel condition between the remote UE and the source relay satisfying a threshold, the reference channel via a broadcast based at least in part on the measurement reference channel configuration, wherein the reference channel includes a remote UE identifier; and
receive, from the source relay, a relay switch command that indicates the at least one candidate relay as a target relay, the relay switch command being for the remote UE to switch from the source relay to the target relay,
wherein receiving the relay switch command for the remote UE to switch is based at least in part on a measurement of the reference channel transmitted from the remote UE.

18. The remote UE of claim 17, wherein:
the one or more processors, to receive the measurement reference channel configuration, are configured to receive the measurement reference channel configuration from the network entity via the source relay;
the one or more processors, to transmit the reference channel, are configured to broadcast the reference channel to the network entity or to a plurality of relays connected to the network entity, wherein the plurality of relays include the source relay and the at least one candidate relay; and
the one or more processors, to receive the relay switch command, are configured to receive the relay switch command from the network entity via the source relay.

19. The remote UE of claim 17, wherein the one or more processors are further configured to:
transmit, to the target relay, a message to set up a PC5 interface between the remote UE and the target relay;
switch from the source relay to the target relay based at least in part on the relay switch command received from the source relay; and
release a PC5 interface between the remote UE and the source relay after switching to the target relay.

20. The remote UE of claim 17, wherein the one or more processors, to transmit the reference channel, are configured to transmit the reference channel over a sidelink shared channel, wherein:
the reference channel is associated with a first sidelink resource pool, and discovery and communication performed over the sidelink shared channel is associated with a second sidelink resource pool;
the reference channel is distinguishable from the discovery and the communication performed over the sidelink shared channel based at least in part on an indication in a payload of the sidelink shared channel;
the reference channel is associated with a first numerology, and the discovery and the communication performed over the sidelink shared channel is associated with a second numerology; or
the reference channel is associated with a numerology, and the discovery and the communication performed over the sidelink shared channel is associated with the numerology.

21. The remote UE of claim 17, wherein the one or more processors are further configured to:
receive, from the source relay, a configuration that indicates a transmission mode for the remote UE to use when transmitting the reference channel.

22. The remote UE of claim 17, wherein the one or more processors are further configured to:
measure a path loss based at least in part on a demodulation reference signal received from the source relay; and
control a power of the reference channel based at least in part on the path loss.

23. The remote UE of claim 17, wherein the switch from the source relay to the target relay is an intra-cell relay switch.

24. A relay for wireless communication, comprising:
one or more memories; and
one or more processors, coupled to the one or more memories, configured to:
receive, from a remote user equipment (UE), a reference channel via a broadcast based at least in part on a channel condition between the remote UE and the relay satisfying a threshold, wherein the reference channel includes a remote UE identifier;
perform a measurement of the reference channel received from the remote UE; and
transmit, to the remote UE, a relay switch command that indicates a target relay, the relay switch command being for the remote UE to switch to the target relay,
wherein transmitting the relay switch command for the remote UE to switch is based at least in part on the measurement of the reference channel received from the remote UE.

25. The relay of claim 24, wherein the one or more processors are further configured to:
receive a measurement reference channel configuration from a network entity, the measurement reference channel configuration including a set of parameters configuring the remote UE to transmit the reference channel via the broadcast; and
transmit the measurement reference channel configuration to the remote UE, wherein the reference channel received from the remote UE is based at least in part on the measurement reference channel configuration.

26. The relay of claim 24, wherein the one or more processors are further configured to:
select the target relay based at least in part on the measurement of the reference channel;
receive, from the remote UE, an indication that a PC5 interface with the remote UE is to be released; and
transmit, to the remote UE, a configuration that indicates a transmission mode for the remote UE to use when transmitting the reference channel.

27. The relay of claim 24, wherein the one or more processors are further configured to:
send, to a network entity, a measurement report that includes the measurement of the reference channel; and
receive, from the network entity, an indication of the target relay based at least in part on the measurement report.

28. The relay of claim 24, wherein:
the reference channel is received from the remote UE over a sidelink shared channel;
the reference channel is associated with a first sidelink resource pool, and discovery and communication performed over the sidelink shared channel is associated with a second sidelink resource pool;
the reference channel is distinguishable from the discovery and the communication performed over the sidelink shared channel based at least in part on an indication in a payload of the sidelink shared channel; or
the reference channel is received periodically from the remote UE.

29. The relay of claim 28, wherein:
the reference channel is associated with a first numerology, and the discovery and the communication performed over the sidelink shared channel is associated with a second numerology;
the reference channel is associated with a numerology, and the discovery and the communication performed over the sidelink shared channel is associated with the numerology;
the reference channel is received from the remote UE based at least in part on an occurrence of a triggering event that occurs when a radio condition of the relay is satisfied; or
the reference channel is received aperiodically from the remote UE.

30. The method of claim 1, further comprising:
establishing a connection with the at least one candidate relay before transmitting the reference signal via the broadcast.

\* \* \* \* \*